Dec. 29, 1931. G. W. GWINN 1,838,177
FEED MECHANISM FOR WEIGHING MACHINES
Filed May 5, 1928 4 Sheets-Sheet 1

INVENTOR
George W. Gwinn
BY
Sydney J. Prescott
ATTORNEY

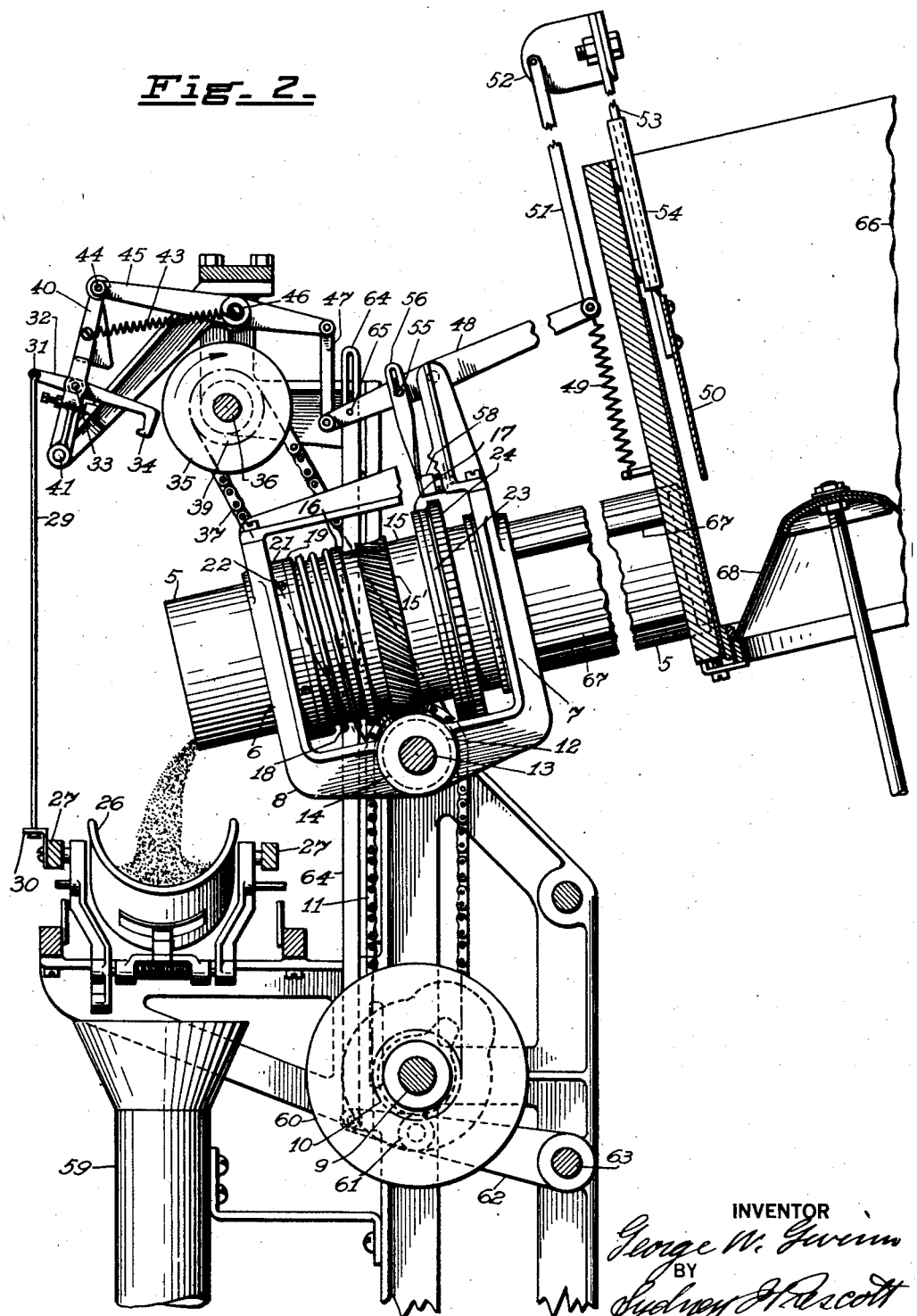

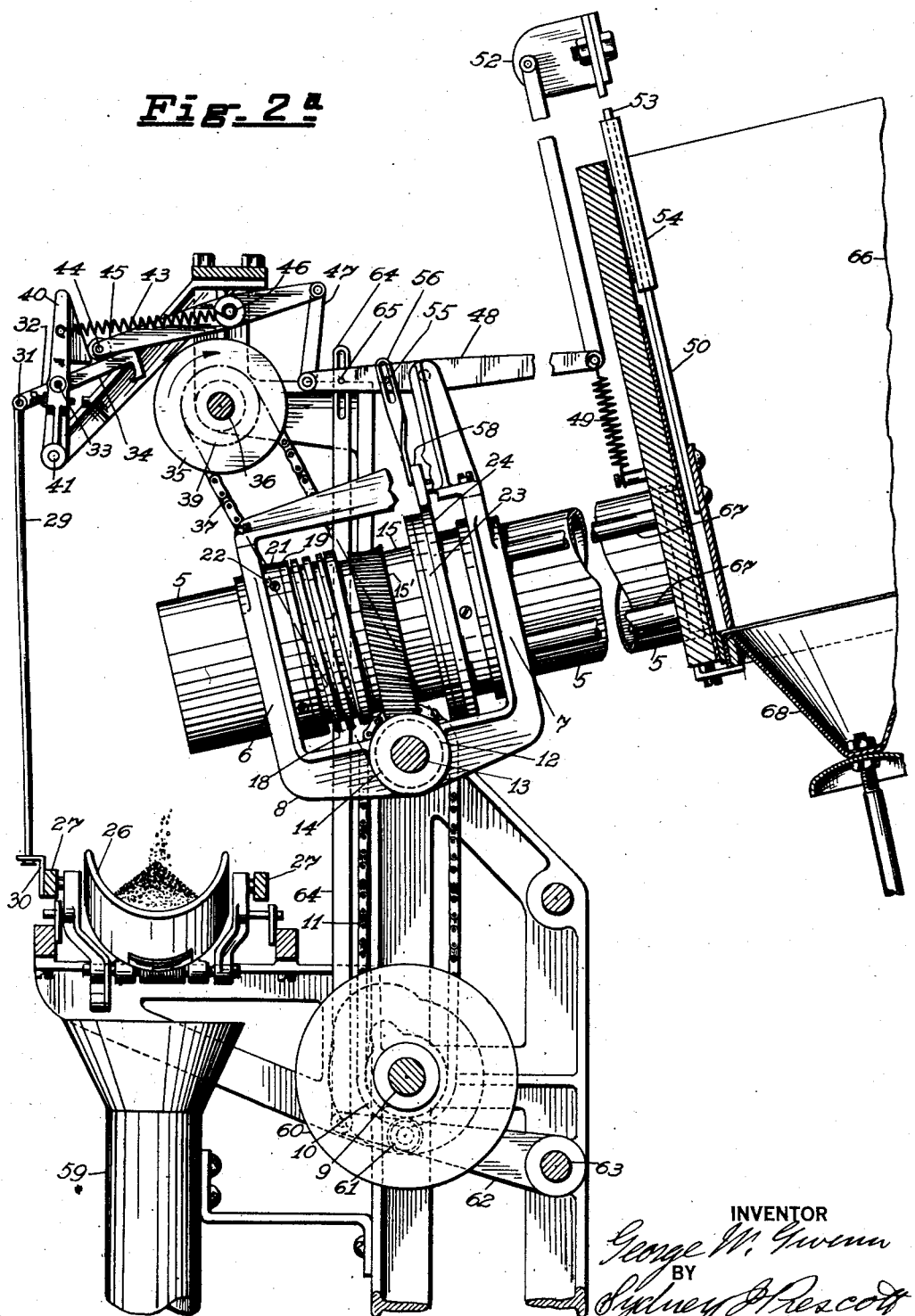

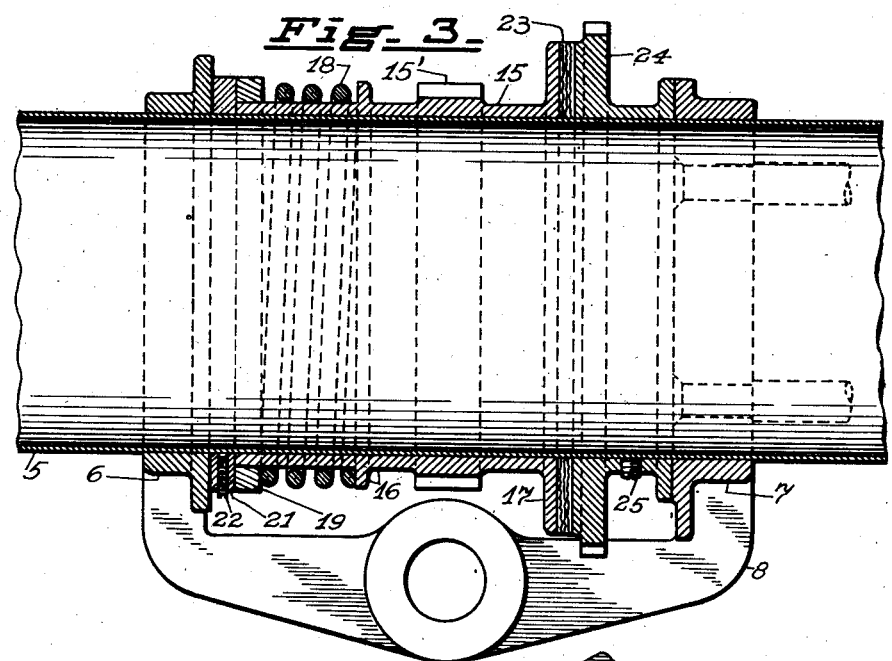

Patented Dec. 29, 1931

1,838,177

UNITED STATES PATENT OFFICE

GEORGE W. GWINN, OF HEWLETT, NEW YORK, ASSIGNOR TO AMERICAN MACHINE & FOUNDRY COMPANY, A CORPORATION OF NEW JERSEY

FEED MECHANISM FOR WEIGHING MACHINES

Application filed May 5, 1928. Serial No. 275,388.

This invention relates to feed mechanisms for weighing machines, for feeding powdered or granulated material to a scale bucket thereof.

A principal object of the invention is the production of such a device having power driven feeding means which uniformly feeds the material to a scale bucket, and which will immediately cease feeding said material when the scale has received a predetermined weight thereof. Another object of the invention is to provide such a device in which the supply of material to the feeding means will be immediately cut off when the scale has received a given weight of material. Still another object is to provide a friction drive means for the feed which permits immediate stopping of the feeding device, without lost motion or backlash. With these and other objects not specifically mentioned in view, the invention consists of certain constructions and combinations which will be hereinafter fully described and then specifically set forth in the claims hereunto appended.

In the accompanying drawings:

Fig. 2 is a side elevation of a section along the line 2—2 in Fig. 1, showing the parts in feeding position;

Fig. 2a is a similar side elevation, showing the parts when the feed is shut off;

Fig. 3 is a sectional detail view of the feed tube and its drive; and

Fig. 4 is a detail view in perspective, showing the drive controls.

Figure 1:
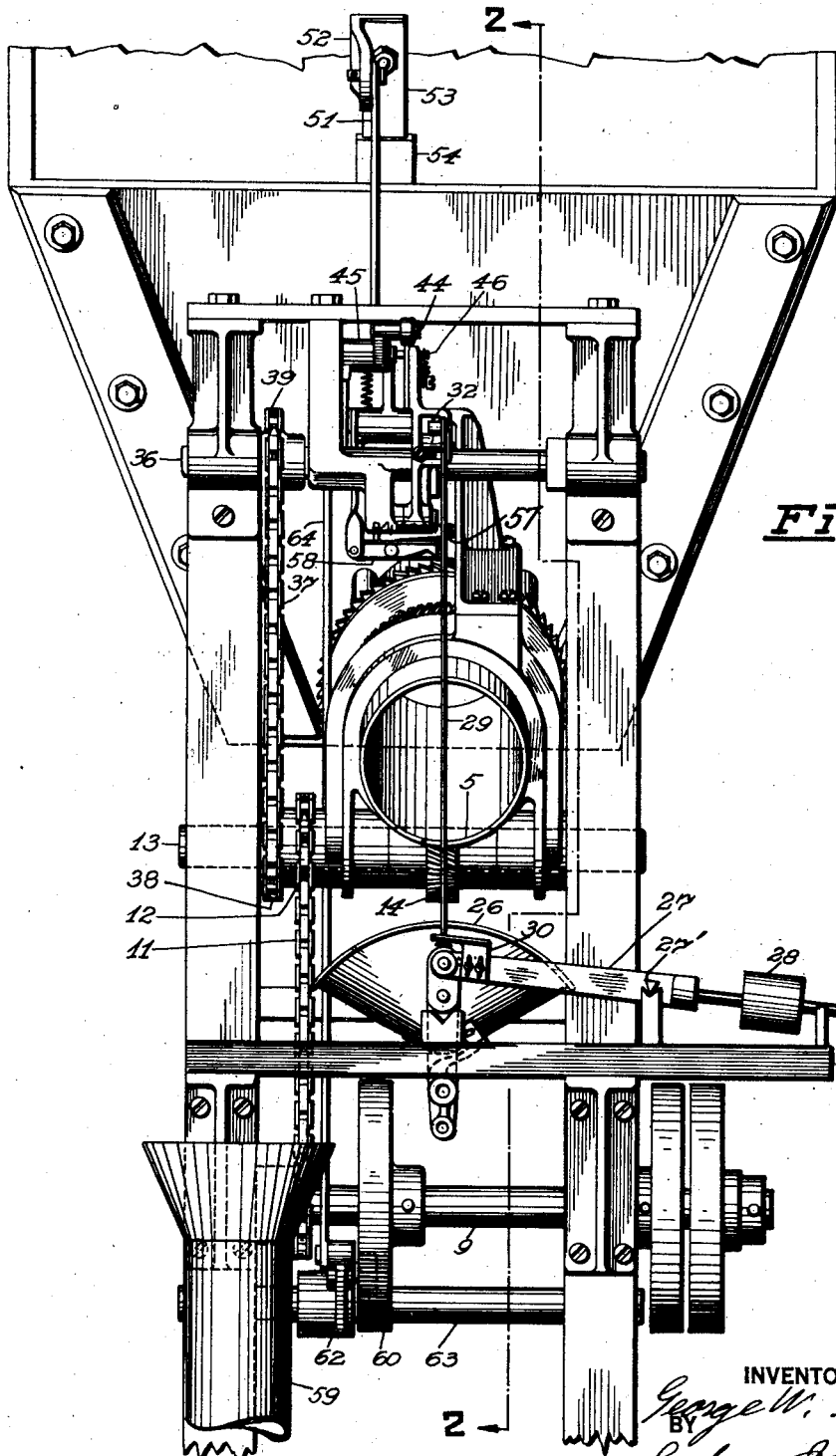
Fig. 1 is a front elevation of the automatic weighing machine.

In carrying the invention into effect, there is provided an inclined feed tube, a scale for weighing material fed by said tube, means for frictionally rotating said tube to load the material into said scale and means for stopping said tube when said scale is loaded. In the best constructions contemplated, the rotating means includes a sleeve journalled on and otherwise in frictional engagement with said tube, together with means for continuously rotating said sleeve. The best constructions also include a ratchet member fast on said tube, a pawl coacting with said ratchet member, and means controlling the operation of the pawl. In the best constructions also, there is provided a gate at the entrance of the tube and connections with said stopping means for operating said gate. The means above referred to may be widely varied in construction within the scope of the claims, for the particular machine selected to illustrate the invention is but one of many possible embodiments of the same. The invention therefore is not to be restricted to the precise details of the structure shown and described.

Referring to the drawings, an inclined feed tube 5, supported in bearings 6 and 7 in a bearing bracket 8 and in communication at its upper end with a magazine 66, is driven from a main shaft 9 by means of a sprocket 10, a chain 11, a sprocket 12, a shaft 13, and spiral gears 14 and 15', the latter gear forming an integral part of a sleeve 15. The sleeve 15 is provided with two flanges 16 and 17 (Fig. 3) and frictionally rotates the tube 5, one end of a thrust spring 18 pressing the friction ring 19, slidable on the sleeve and bearing against a collar 21 fastened to tube 5 by set screws 22. The other end of the spring bears against flange 16, forcing flange 17 against friction ring 23 which, in turn, presses against a radial surface of a ratchet 24 fastened to the feed tube 5 by set screws 25. The gear 15' is driven continuously, the frictional connection between it and the sleeve insuring rotation of the feed tube 5 as long as it is free to rotate, but permitting immediate stopping of the tube without stopping the movement of the sleeve.

As the tube revolves, it feeds a substantially uniform stream of material into a scale bucket 26 which swings in a yoke shaped scale beam 27 fulcrumed on knife edges 27'. When a predetermined weight of material has been fed into a bucket 26, the latter overbalances the weight 28, and the bucket 26 descends, carrying with it a link 29 fastened to the scale beam 27 by an angle plate 30. The upper end of a link 29 is fastened by a pin 31 to a lever 32 (Fig. 2) fulcrumed on a pin 33. Thus, by descent of the link 29, a friction shoe 34 at one end of the lever 32 contacts with a friction wheel 35 on a shaft 36, which is continuously driven by a chain 37 running over sprockets 38 and 39. By the engagement of the shoe 34 with the wheel 35, a trip latch 40, fulcrumed on a pin 41 in a bracket 42, is forced back against the tension of a spring 43 and passes from under a roller 44 at the end of a lever 45 on a stud 46, thus allowing the lever 45 to drop and, through a link 47 and a lever 48, permitting spring 49 to pull down a gate 50 at the entrance of the feed tube by means of a link 51, an angle plate 52, and a bar 53 sliding in a guide 54, thereby closing the end of feed tube 5.

In order to simultaneously stop the feeding movement of the tube 5, the movement of the lever 48 caused by the spring 49, raises a pin 55 in a slot of a link 56 permitting a leaf spring 57 to produce engagement between a pawl 58 (Fig. 4) and the ratchet 24 fixed to the feed tube 5, thereby immediately stopping rotation of the feed tube 5. The sleeve 15 continues to revolve around tube 5, ready on release of the ratchet to again rotate the tube. Fig. 2a shows the changes in the positions of the various parts above described, when sufficient material has been fed into bucket 26 to tip the scale.

After the scale bucket has been made to discharge its load into the discharge tube 59, by suitable means not shown, the weight 28 causes the bucket 26 to rise, thus pushing the link 29 up and bringing the friction shoe 34 at the end of the lever 32 into its downward position. Thereupon, a continuously driven cam 60, by means of a roller 61, depresses a lever 62 fulcrumed on a shaft 63, thereby causing a link 64 to descend, a slot in the upper end of this link engaging with a pin 65 attached to the lever 48. One end of the lever 48, thus being forced down by the link 64, the other end lifts link 51, and the gate 50 is raised, restarting the flow of material into the tube 5 from the magazine 66 attached by rods 67 to bearing bracket 8 and having the reversible flexible bottom 68. Also the pawl link 56 is depressed by the pin 55 on lever 48, the pawl 58 thereby being disengaged from the ratchet 24, with the result that the feed tube 5 immediately starts to revolve with the sleeve 15. In the lowermost position of link 64, the outer end of lever 45 is raised sufficiently to clear the trip latch 40, which is pulled under roller 44 by spring 43, thus locking the parts into feeding position until scale bucket 26 has received another full charge.

It will be noted that as a result of the frictional connection between the feed tube and the driving means for the tube, the tube can be stopped by means acting directly on the tube without undue jarring of the driving means and without appreciable feeding movement after said stoppage, such as would result from lost motion or backlash in the driving means, if the means stopping the tube acted less directly.

What is claimed is:

1. The combination with an inclined feed tube, of a scale for weighing material fed by said tube, means for frictionally rotating said tube to load said scale, and scale-actuated means for stopping said tube when said scale is loaded.

2. The combination with an inclined feed tube, of a scale for weighing material fed by said tube, means for frictionally rotating said tube to load said scale, and scale-actuated means for stopping said tube when said scale is loaded, said rotating means including a sleeve journalled on and otherwise in frictional engagement with said tube, and means for continuously rotating said sleeve.

3. The combination with an inclined feed tube, of a scale for weighing material fed by said tube, means for frictionally rotating said tube to load said scale, and scale-actuated means for stopping said tube when said scale is loaded, said rotating means including a sleeve journalled on said tube, a member of said stopping means fast on said tube, means for keeping said sleeve in frictional engagement with said member, and means for continuously rotating said sleeve.

4. The combination with an inclined feed tube, of a scale for weighing material fed by said tube, means for frictionally rotating said tube to load said scale, and scale-actuated means for stopping said tube when said scale is loaded, said rotating means including a sleeve journalled on said tube and having a flange, a member fast on said tube at one end of said sleeve, a collar fast on said tube at the other end of said sleeve, a thrust spring engaging said collar and said flange to keep said sleeve in frictional engagement with said member, and means for continuously rotating said sleeve.

5. The combination with an inclined feed tube, of a scale for weighing material fed by said tube, means for frictionally rotating said tube to load said scale, and scale-actuated means for stopping said tube when said scale is loaded, said stopping means including a ratchet member fast on said tube, a pawl coacting with said ratchet member, and means controlling the operation of said pawl.

6. The combination with an inclined feed tube, of a scale for weighing material fed by said tube, means for frictionally rotating said tube to load said scale, and means for stopping said tube when said scale is loaded, said stopping means including a stop for said tube, and operating connections for said stop controlled by said scale.

7. The combination with an inclined feed tube, of a scale for weighing material fed by said tube, means for frictionally rotating said tube to load said scale, and means for stopping said tube when said scale is loaded, said stopping means including a stop for said tube, and linkage connecting said stop with said scale.

8. The combination with an inclined feed tube, of a scale for weighing material fed by said tube, means for frictionally rotating said tube to load said scale, and means for stopping said tube when said scale is loaded, said stopping means including a stop for said tube, spring actuated means for operating said stop, and a trip-latch controlled by said scale for releasing said spring actuated means for operation.

9. The combination with an inclined feed tube, of a scale for weighing material fed by said tube, means for frictionally rotating said tube to load said scale, scale-actuated means for stopping said tube when said scale is loaded, a gate at the entrance of said tube, and connections with said stopping means for operating said gate.

10. The combination with an inclined feed tube, of a scale for weighing material fed by said tube, means for frictionally rotating said tube to load said scale, means for stopping said tube when said scale is loaded, a gate at the entrance of said tube, and connections with said stopping means for operating said gate, said stopping means and said gate being controlled by said scale.

11. The combination with an inclined feed tube, of a scale for weighing material fed by said tube, means for frictionally rotating said tube to load said scale, means for stopping said tube when said scale is loaded, a gate at the entrance of said tube, spring actuated means for operating said gate, and a trip-latch controlled by said scale for releasing said spring actuated means for operation.

12. In a weighing machine, the combination with an inclined feed tube, of a sleeve journalled on and otherwise in frictional engagement with said tube, means for continuously rotating said sleeve, and means for stopping said tube.

13. In a weighing machine, the combination with an inclined feed tube, of a sleeve journalled on said tube and having a flange, a collar fast on said tube at one end of said sleeve, a member fast on said tube at the other end of said sleeve, a thrust spring engaging said collar and said member to keep said sleeve in frictional engagement with said member, and means for continuously rotating said sleeve.

14. In a weighing machine, the combination with a rotatory inclined feed tube, of a scale for weighing material fed by said tube, a stop for said tube, and operating connections for said stop controlled by said scale.

15. In a weighing machine, the combination with a rotatory inclined feed tube, of a scale for weighing material fed by said tube, a stop for said tube, and linkage connecting said stop with said scale.

16. In a weighing machine, the combination with a rotatory inclined feed tube, of a scale for weighing material fed by said tube, a stop for said tube, spring actuated means for operating said stop, and a trip-latch controlled by said scale for releasing said spring actuated means for operation.

17. In a weighing machine, the combination with a rotatory inclined feed tube, of a gate at the entrance of said tube, and interconnected mechanism for stopping said tube and closing said gate.

18. In a weighing machine, the combination with a rotatory inclined feed tube, of a gate at the entrance of said tube, a scale for weighing material fed by said tube, a stop for said tube, closing means for said gate, and linkage connecting said scale with said stop and said closing means.

19. In a weighing machine, the combination with a rotatory inclined feed tube, of a gate at the entrance of said tube, a scale at the delivery end of said tube, spring actuated means for stopping said tube and closing said gate, and means controlled by said scale for releasing said spring actuated means for operation.

In testimony whereof, I have signed my name to this specification.

GEORGE W. GWINN.